May 29, 1945.   K. CLARK   2,376,901
TIMING CONTROL
Filed March 29, 1941   6 Sheets-Sheet 1

INVENTOR.
Kendall Clark
BY Spencer Hardman and Fehr
attorneys

May 29, 1945.                K. CLARK                    2,376,901
                          TIMING CONTROL
              Filed March 29, 1941          6 Sheets-Sheet 2

INVENTOR.
Kendall Clark
BY Spencer Hardman and Fehr
Attorneys

May 29, 1945.　　　K. CLARK　　　2,376,901
TIMING CONTROL
Filed March 29, 1941　　　6 Sheets-Sheet 4

INVENTOR.
Kendall Clark
BY Spencer Hardman and Fehr
attorneys

May 29, 1945. K. CLARK 2,376,901
TIMING CONTROL
Filed March 29, 1941 6 Sheets-Sheet 5

INVENTOR.
Kendall Clark
BY Spencer Hardman and Lehr
attorneys

May 29, 1945. K. CLARK 2,376,901
TIMING CONTROL
Filed March 29, 1941 6 Sheets—Sheet 6

INVENTOR.
Kendall Clark
BY Spencer Hardman and Fehr
Attorneys

Patented May 29, 1945

2,376,901

UNITED STATES PATENT OFFICE 2,376,901

TIMING CONTROL

Kendall Clark, Oakwood, Ohio, assignor to General Motors Corporation, Dayton, Ohio, a corporation of Delaware Application March 29, 1941, Serial No. 385,895

15 Claims. (Cl. 161—1)

This invention relates to a timing control and more particularly to controls for automatic washing machines.

It has been found desirable to provide automatic washing machines with a means which can be set to provide washing periods of different lengths so that the washing period may be adjusted to suit the various types and condition of the clothes to be washed. This makes the control complicated because it is necessary to fill the machine prior to the washing period. Of course this can be done manually but it is more desirable to do it automatically. A float control has been used for controlling the filling of the washing machine but float controls are unreliable.

It is therefore an object of my invention to provide a simple timing control having a selectively variable washing period preceded by a fill period which is unchanged by the variations of the washing period.

It is another object of my invention to provide for such a control a selection of hot or mixed water for filling the machine.

It is another object of my invention to provide a mechanical clock-driven timing control for washing machines which will provide a selectively variable wash period preceded by a fill period.

It is another object of my invention to provide such a control which can be reset at any time to immediately interrupt any operation.

It is another object of my invention to provide convenient means for automatically filling the tub and soaking of articles to be washed.

It is still another object of my invention to provide means for preventing excessive load and wear upon the timing device.

Further objects and advantages of the present invention will be apparent from the following description, reference being had to the accompanying drawings, wherein a preferred form of the present invention is clearly shown.

Brief description

For the purpose of illustrating the application of my improved control I have shown one of many possible forms of automatic washing machines which might be used in connection with this control. Briefly, the washing machine includes a control of hot and mixed water for filling the tub together with a reversible driving motor which pulsates or agitates the water in the tub when operating in one direction and which spins the tub to dry the clothes when it rotates in an opposite direction.

For controlling the machine I provide a mechanical clock-driving mechanism which is wound when the handle is moved from the "off" position to one of the selective washing positions. The clock mechanism, through a friction drive, drives two control cams. The main control cam is driven directly through the friction drive provided between it and the clock mechanism. The second control cam is driven when effective through a second friction drive. This second cam becomes operative whenever the control handle is set to any one of the selective washing periods and provides an initial filling of the washing machine prior to the beginning of each washing period regardless of the length of the washing period. In order to remove the friction load upon the clock mechanism of this second cam a lock is released to allow the clock mechanism to drive the first or main cam without frictional load from the second cam after the second cam completes its operation.

The washing machine illustrated

Figure 1:
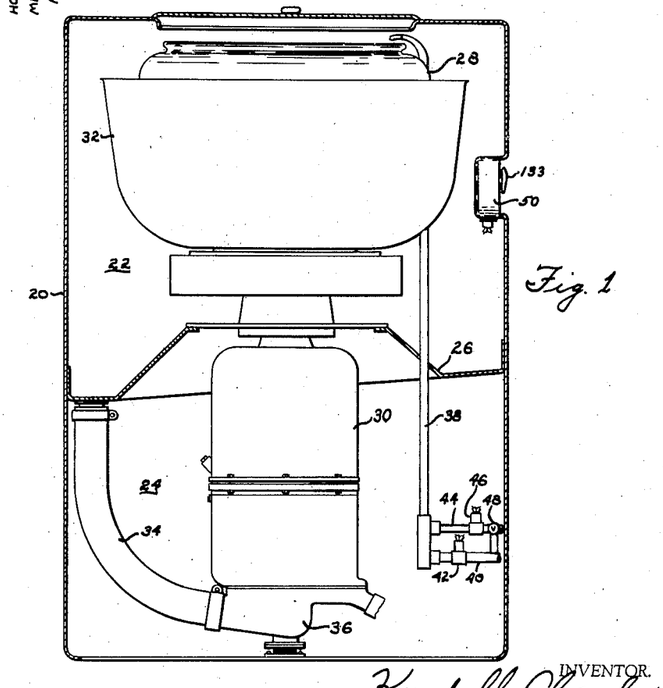
Fig. 1 is a sectional view illustrating one of the many forms of automatic washing machines with which my improved control can be employed.

Referring now to the drawings and more particularly to Fig. 1, there is shown one of the many forms of automatic washing machines which may be used to illustrate the invention. In this particular washing machine, there is shown an outer casing 20 which is divided into an upper compartment 22 and a lower compartment 24 by a catch basin 26. Within the upper compartment there is provided a rotatable tub 28 containing an agitating means. Within the lower compartment beneath the tub there is provided a sealed casing 30 containing a reversible electric motor and suitable drive mechanism for agitating or pulsating the contents of the tub 28 when the electric motor is operated in one direction and for spinning the tub 28 for expelling the water therefrom when the motor is rotated in the opposite direction.

The tub 28 is surrounded by a riser 32 which retains the water in the tub until the tub and riser are spun by the electric motor in the casing 30. The spinning of the tub 28 and the riser 32 causes the water to be thrown over the rim of the riser 32 so that it is caught in the catch basin and removed through a drain conduit 34 which is connected to a centrifugal pump 36 provided at the bottom of the casing 30 for forcing the water through the customary drain hose. The tub 28 is filled by a pipe 38 which has a spout extending over the rim of the tub 28. At the lower end this pipe 38 connects to a hot water pipe 40 provided with an electrically operated control valve 42 and a mix or tempered water pipe 44 provided with an electrically operated control valve 46 as well as a thermostatic mixing valve 48 which controls the mixing of the mixed water. At a suitable point on the outside of the casing there is provided a recess for receiving the automatic control 50.

Figure 19:
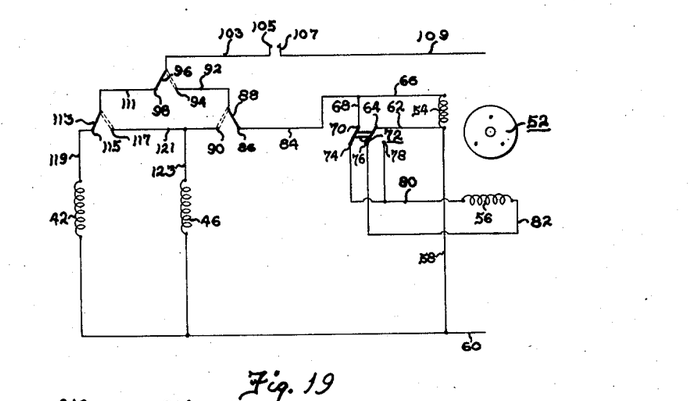
Fig. 19 shows a simplified form of wiring diagram for the control and the washing machine.
Figure 20:
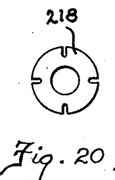
Fig. 20 is a plan view of the spring pressure plate 218.
Figure 21:
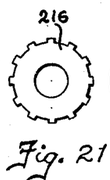
Fig. 21 is a plan view of the serrated disc 216.
Figure 22:
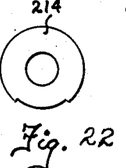
Fig. 22 is a plan view of the notched disc 214.

The simple wiring diagram Fig. 19

Referring now more particularly to Fig. 19 there is shown diagrammatically the electric motor 52 which is enclosed in the sealed casing 30 which drives the agitator or pulsating means when operating in one direction and which spins the tub 28 when operating in the other direction. This electric motor 52 includes a running winding 54 and a starting or phase winding 56. The running winding 54 has one of its terminals connected by the conductor 58 to one of the supply lines or conductor 60. This same terminal of the running winding 54 is also connected by the conductor 62 to the terminal 64 of a pole changer switch 72. The other end of the running winding is connected by a conductor 66 and by the conductor 68 to the terminal 70 of the pole changer switch 72. This pole changer switch 72 is adapted to make contact with the terminals 74 and 76 when the motor operates in the forward direction to agitate or pulsate the washing fluid in the tub 28 and to make contact with the terminals 76 and 78 to cause the motor 52 to operate in the reverse direction to spin the tub 28 for drying purposes. The terminals 74 and 78 are joined together and connected by the conductor 80 to one terminal of the starting or phase winding 56 while the second terminal of the starting and phase winding 56 is connected by the conductor 82 to the terminal 76.

The junction of the conductors 66 and 68 is also connected by the conductor 84 to the terminal 86 of a double-throw switch including the movable contact member 88 which is adapted to make contact with either the terminal 86 or the terminal 90. The double-throw contact 88 is connected to the conductor 92 which in turn connects to the contact 94 of another double-throw switch having a movable contact 96 adapted to make contact with either the contact 94 or the contact 98. The movable contact 96 of this last mentioned double-throw switch is connected by the conductor 103 to a single pole switch provided with contacts 105 and 107 which in turn connects to the other line or supply conductor 109.

The terminal 98 is connected by a conductor 111 to a single pole double-throw switch including the movable contact 113 and the stationary contacts 115 and 117 with which the movable contact 113 is adapted to contact. The terminal 115 is connected by the conductor 119 to the solenoid actuating coil of the hot water valve 42 which in turn connects to the supply conductor 60. The terminal 117 is connected to the terminal 90 by a conductor 121 which in turn is connected by the conductor 123 to the solenoid actuating coil of the mixed water control valve 46 which has its other terminal connected to the supply conductor 60.

This electrical system is employed in the following manner: The single pole single-throw switch 105—107 is opened whenever the timing control 50 is being set and deenergizes all circuits during setting of the timer. The single-pole double-throw switch having the movable contact 113 is manually controlled and may be moved into engagement with the contact 115 when it is desired to use all hot water for washing purposes and may be moved into contact with the terminal 117 when it is desired to use mixed hot and cold water for washing purposes. The single-pole double-throw switch having the movable contact 96 is moved into engagement with the contact 98 automatically at the start of each washing and causes the tub to be filled with either hot or mixed water as desired. The operation of this switch is so timed that it is kept in this position the proper length of time to hold either of the valves 42 or 46 open for a sufficient length of time to properly fill the tub 28.

Figure 2:
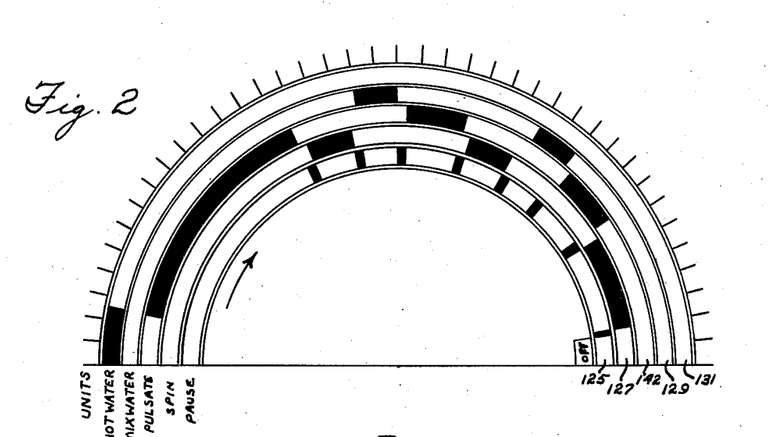
Fig. 2 is a timing diagram for the washing machine and control shown in Fig. 1.

The timing diagram in Fig. 2 reads clockwise and has an outer strip 131 which indicates the supply of initial hot water to the tub for the washing period to follow. The actual control knob 133 and legends of the timing device 50, are in effect exactly the reverse of the timing diagram. To set the actual device the knob 133 is manually turned to the right substantially 180° to provide a complete washing period.

After the knob is released, it slowly moves in the return or counterclockwise direction at a timed speed. The marks upon the outer edge of the timing diagram in Fig. 2 are each intended to indicate a unit of time, such as a minute. As the knob 133 moves, it controls the various circuits in accordance with the indications upon the timing diagram. At the end of the first fill period, the timing mechanism will move the movable contact 96 into contact with the contact 94 and deenergizes contact 98 thereby opening the solenoid water valve circuit 111. When the movable contact 96 makes contact with the contact 94 the electrical circuit through the starting and running windings of the motor 52 is completed. The current flows through the conductor 92, the movable contact 88 to the stationary contact 86, the conductor 84, the conductor 66, the running winding 54 and the conductor 58 to the supply conductor 60. Also current flows from the conductor 84 through the conductor 68, the movable contact 70, the conductor 74, the conductor 80 to the starting winding 56, the conductor 82, the movable contact 64, the conductor 62 and again the conductor 58 to the supply conductor 60. This energization causes the motor 52 to operate in the forward direction to cause the mechanism within the sealed casing 30 to operate a suitable agitator or pulsator within the tub 28.

After the motor 52 is operated in this direction to agitate the washing fluid in the tub 28 for the desired length of time, as indicated in the strip 142 on the timing diagram shown in Fig. 2, the pole changing switch 72 will be moved to place the movable contacts 64 and 70 at an intermediate position to stop the motor and provide deenergization for a sufficient time to allow the motor 52 to stop as indicated upon the strip 125 of the timing diagram in Fig. 2 which indicates a pause or open circuit period. After this pause, the pole changing switch 72 is moved so that its movable contacts 64 and 70 engage the contacts 78 and 76 to operate the electrical motor 52 in the opposite direction to spin the tub 28 for drying the clothes and other material to be washed in the tub 28. The length of this spin period is indicated upon the strip 127 of the timing diagram of Fig. 2. At the termination of this first spinning period, the contacts of the pole changer switch 72 are then moved to an intermediate position to provide the second pause period as indicated on the timing diagram in the strip 125.

After this pause the movable contact 88 is moved into contact with contact 90 to cause current to flow through the conductor 121 and the conductor 123 through mixed water valve 46 to the supply conductor 60 in order to supply the first rinse water to the tub 28. As indicated upon the strip 129 of the diagram in Fig. 2 which indicates the supply of the mixed water, the timing device maintains the movable contact 88 in contact with the contact 90 a sufficient length of time to supply the desired amount of rinse water to the tub. After this, the movable contact 88 is moved to an intermediate position and thence into contact with the contact 86 to again energize the electric motor 52 in a forward direction to cause agitation of the first rinse water. As indicated in the diagram this rinse water agitation is followed by a pause after which the first rinse water is spun out of the tub by the appropriate reversing of the pole changer switch 72.

This spin period is likewise followed by a pause, after which the movable contact 88 is moved in engagement with the contact 90 to again energize and open the mixed water valve 46 to introduce the second rinse water into the tub. Following this, the contact 88 is again returned into contact with the contact 86 to again energize the motor 52 in the forward direction to agitate the second rinse water which is followed by an appropriate pause and a longer spinning period to spin the second rinse water from the tub and to centrifugally dry the clothes, after which the machine is stopped as indicated on the timing diagram of Fig. 2.

Figure 18:
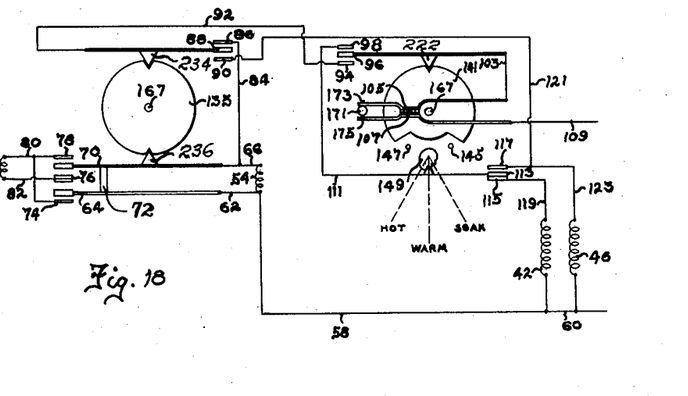
Fig. 18 shows one form of wiring diagram for the control and the washing machine.

Description of Fig. 18

Figure 7:
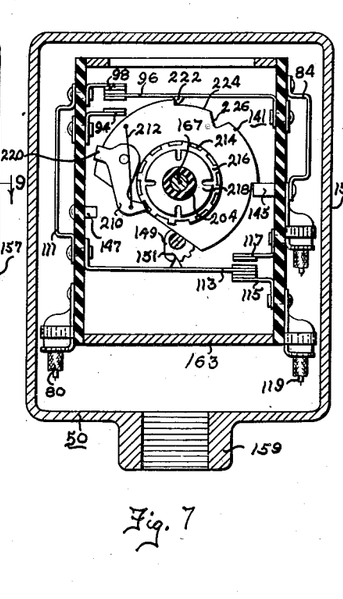
Fig. 7 is a sectional view taken along the line 7—7 of Fig. 3.
Figure 8:
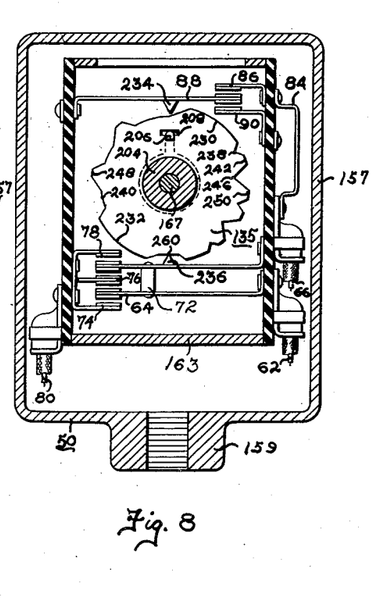
Fig. 8 is a sectional view taken along the line 8—8 of Fig. 3.

Referring now more particularly to Fig. 18, there is shown diagrammatically, a main cam 135 located below the single-throw switch having a movable contact 88 and provided with a tooth-shaped cam follower 234. Beneath the main cam 135 is a pole changing switch 72 provided with a cam follower 236. The cam 135 is limited to substantially 180° of rotation so that separate cam surfaces may be provided for operating the movable contact 88 as well as the pole changer switch 72. An auxiliary cam 141 is located beneath the single-throw switch having the movable contact 96. This movable contact 96 is provided with a cam follower 222 for engaging the cam 141. The cam 141 is provided with a friction drive connection with the main cam 135. It is limited in its movement in both directions by the stop pins 145 and 147 as shown in Fig. 7. By this friction drive connection with the main cam 135 together with the stop pins 145 and 147, the auxiliary cam is always advanced to its position against the stop 145 when the main cam 135 is set by a clockwise movement to any one of the selected washing positions.

All the washing, rinsing and drying operations take place upon the return 180° of movement of the main cam. However, it should be understood by this arrangement, that at the beginning of the return movement of the main cam 135, the auxiliary cam 141 will be in engagement with its second stop pin 145. During this time the cam 141 actuates the follower 222 to hold the movable contact 96 in contact with the stationary contact 98 a sufficient length of time to fill the tub initially with either hot or mixed water, after which the movable contact 96 is moved into engagement with the stationary contact 94. Following this, the lug 220 of the pawl 218 which is pivotally mounted on the auxiliary cam 141 engages the stop pin 147 to stop the operation of the auxiliary cam 141 and to keep it in position so that upon any subsequent setting of the knob 133 to any one of the selected washing positions, this auxiliary cam will be moved so as to provide the initial filling of the tub prior to any subsequent washing operations.

Figures 3, 4, 5:
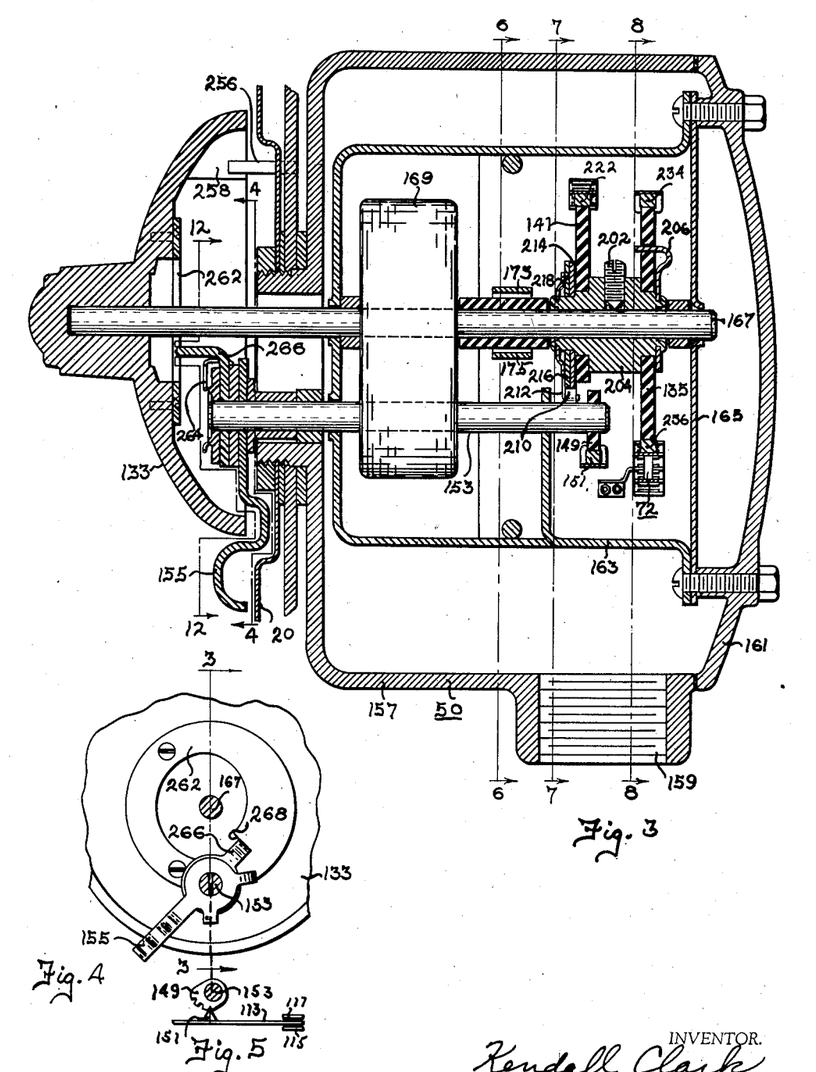
Fig. 3 is a vertical sectional view of the control shown in Fig. 1 taken on the line 3—3 of Fig. 4.
Fig. 4 is a sectional view taken along the line 4—4 of Fig. 3.
Fig. 5 is a fragmentary view showing the position of the water control contacts when the water control is in the position shown in Fig. 4.
Figure 6:
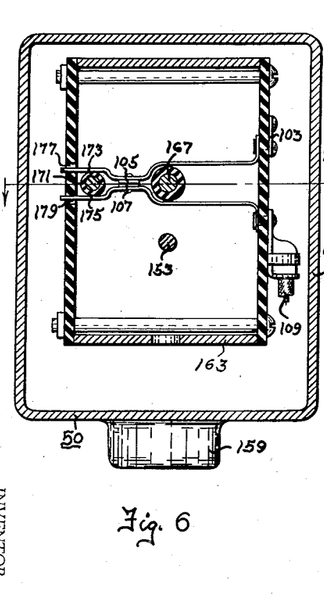
Fig. 6 is a sectional view taken along the line 6—6 of Fig. 3.

A manually operable cam 149 is provided with three distinct notches, one being a comparatively high notch which receives the cam follower 151 in order to hold the movable contact 113 in engagement with the stationary contact 115 to provide an initial hot water fill for the washing period. The two lower notches allow the movable contact 113 to move in engagement with the stationary contact 117. The middle notch provides an initial filling of the tub 28 with mixed hot and cold water prior to the washing period. The other notch provides hot and cold water for soaking as explained on page 6 lines 43 to 66 inclusive. This cam 149 is mounted upon the end of the shaft 153 as shown in Fig. 3 which shaft is provided with a handle 155 extending beneath this knob 133.

The timer structure

Referring now more particularly to the remaining figures for the mechanical construction of the timer, there is shown a housing 157 provided with a threaded outlet 159 for connection with a pipe through which the conductors may extend to the electric motor and the valve as well as to the source of current supply. The housing 157 has a removable back plate 161 to which is fastened the casing 163 and the back plate 165 of the timing mechanism proper.

Centrally located in the casing 163 is the rotatable shaft 167 having the knob 133 mounted upon its front end. Also mounted upon the shaft 167 is a mechanical clock mechanism 169, the general construction of which is shown in Figs. 14 to 17. This clock mechanism generally consists of a main spring fastened to and wound by the shaft 167 and a clock mechanism having its final gear connected by a friction drive to the shaft 167. By this means, when the knob 133 is turned in a clockwise direction to any one of the various selected washing positions the main spring is wound nearly to its fullest extent. The mechanical clock mechanism, however, is not operated but allows the shaft to be turned by reason of the friction drive connection between the main shaft and the final drive gear of the clock mechanism. However, when the knob is released, the main spring will tend to return the shaft to its original position by movement in a counterclockwise direction. However, inasmuch as the friction drive connection between the final drive gear of the clock mechanism and the shaft is made stronger than the main spring, the rotation of the shaft powered by the main spring will be controlled and timed in its rotation by the clock mechanism. For example, the clock mechanism may be so timed that it will permit the shaft to turn 180° in 30 minutes.

Figure 9:
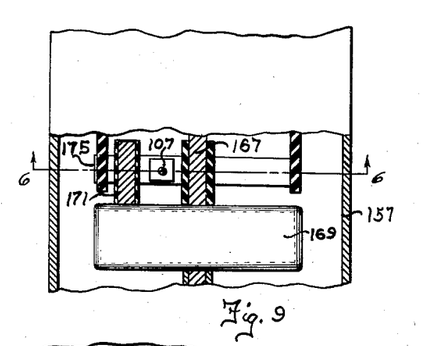
Fig. 9 is a sectional view taken along the line 9—9 of Fig. 6.
Figures 10, 11:
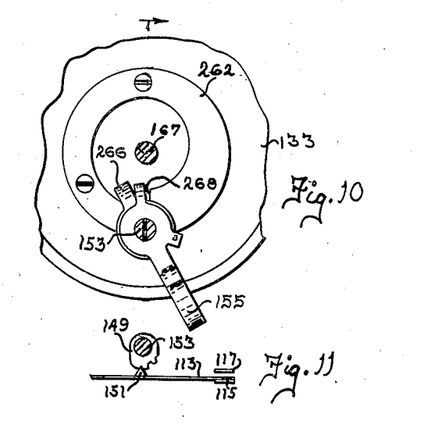
Fig. 10 is a sectional view taken along the line 4—4 of Fig. 3 showing the control lever in a different position from the lever in Fig. 4.
Fig. 11 is a fragmentary view similar to Fig. 5, showing the water control contacts when the water control is in the position shown in Fig. 10.
Figure 12:
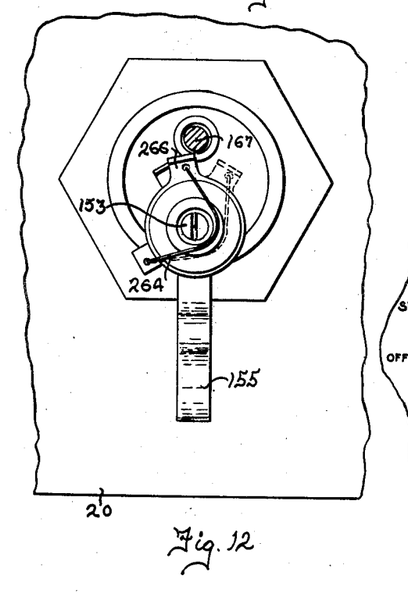
Fig. 12 is a sectional view taken along the line 12—12 of Fig. 3.
Figure 13:
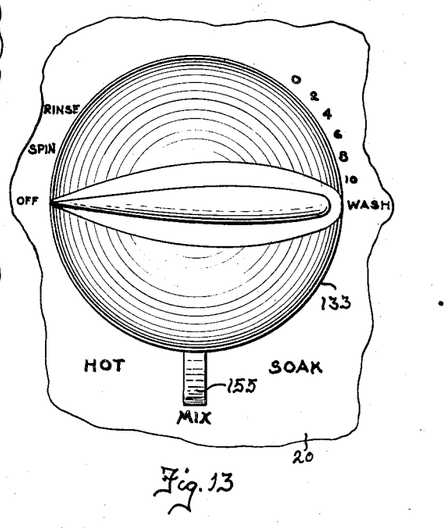
Fig. 13 is a front view of the control knob and dial.

This friction drive also serves another purpose. When the knob 133 is being set, the friction drive between the main shaft and the final drive gear of the clock mechanism provides a reaction which tends to rotate the clock mechanism bodily. Instead of fixing this clock mechanism rigidly, I provide a pin 171 extending from the clock mechanism as shown in Fig. 9, in between the spring arms 173 and 175 which support the contacts 105 and 107. The ends of these spring arms 173 and 175 extend through the slots 177 and 179 in the side wall of the casing 163 in order to limit the separation of the contacts 105 and 107.

By this arrangement, when the knob 133 is rotated in a clockwise direction, the upper contact 105 is lifted upwardly away from the lower contact 107 by the pin 171 which raises the spring arm 173 to the top of the slot 177. After the spring arm 173 reaches the top of the slot 177 the clock mechanism can rotate no further and the winding operation functions normally. The lower spring arm 175 remains at the top of the slot 179. When the knob 133 is rotated in a counterclockwise direction the pin 171 moves the spring arm 175 downwardly to lower the contact 107 away from the contact 105 until the spring arm 175 reaches the bottom of the slot 179 which prevents further rotation of the clock mechanism. The spring arm 173 remains at the bottom of the slot 177 during this operation. In this very simple way, I am able to deenergize all circuits whenever the knob 133 is being set to any position.

The clock mechanism

Referring now particularly to the clock mechanism illustrated in Figs. 14 to 17, there is shown a main spring 181 which is pinned at its inner end to the main shaft 167 of the timing mechanism. The outer end of the main spring is anchored to a pin 183 provided upon the left frame 185 of the clock mechanism. This main spring 181 is wound substantially tight when the knob 133 is turned in a clockwise direction to its fullest extent. When the knob 133 is released, the main spring supplies the power for rotating the main shaft in a counterclockwise direction for completing the entire washing cycle.

Figure 14:
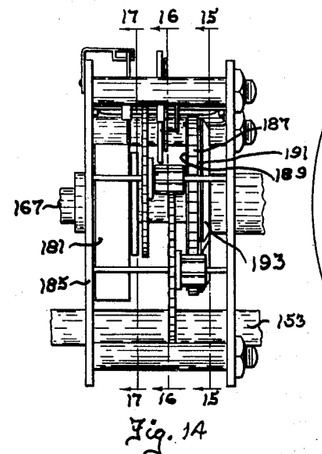
Fig. 14 is a side view of the mechanical clock driving mechanism.
Figure 15:
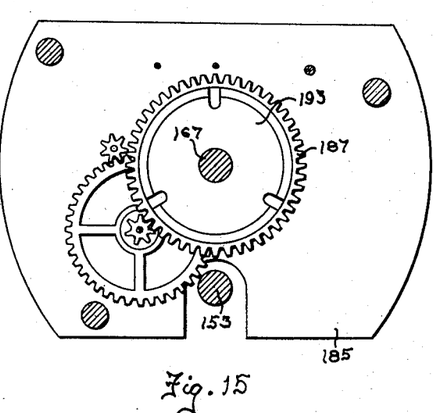
Fig. 15 is a sectional view taken along the line 15—15 of Fig. 14.
Figure 16:
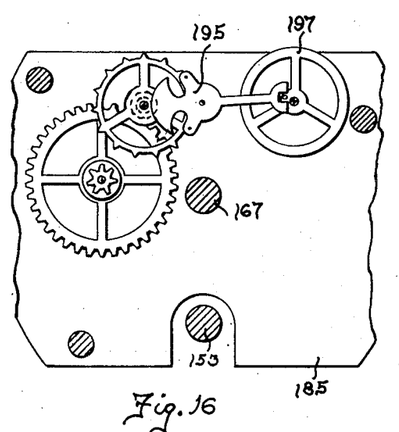
Fig. 16 is a sectional view taken along the line 16—16 of Fig. 14.
Figure 17:
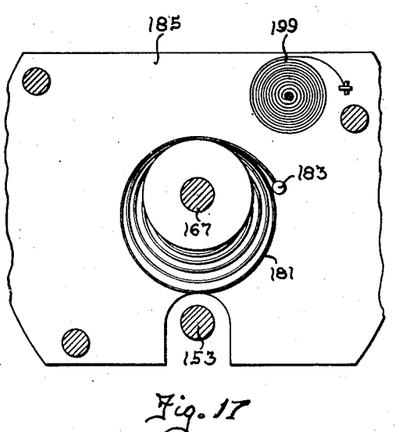
Fig. 17 is a sectional view taken along the line 17—17 of Fig. 14.

A final drive gear 187 of the clock mechanism is also mounted upon the shaft 167. This gear, however, is rotatably mounted upon the shaft and is held between friction discs 189 and 191 which are fixed rotatably to the main shaft 167 by a key, spline or flatted construction whereby the friction plates may move longitudinally of the shaft to a slight degree, but are fixed rotatably to the shaft. These friction plates 189 and 191 hold the final drive gear 187 in a frictional connection with the main shaft by reason of the slightly cupped spring or pressure plate 193 which clamps the two friction plates to the opposite sides of the final drive gear in order to provide a frictional connection between the final drive gear and the main shaft 167 which is greater than the power of the main spring 181 and which is also sufficient to operate the contacts 105 and 107.

Connected to this final drive gear 187 is a conventional clock gear train and mechanism including a lever escapement mechanism 195 and a balance-wheel 197 controlled by a conventional hair spring 199. This gear train lever escapement mechanism and balance-wheel regulate the rotation of the final drive gear 187 and the main shaft 167 through the frictional connection so that the main spring 181 will rotate the shaft 167 at a timed speed like the minute hand shaft of a conventional mechanical clock. This clock mechanism is so designed that the shaft 167 will make one-half revolution in 30 minutes.

The contact cams

Fastened to the rear portion of the main shaft 167 by the set screw 202 is a hub 204 which carries the main cam 135. This main cam 135 is rotatably mounted upon the hub 204 but is connected thereto by the tongue 206 which is riveted at one end to the hub 204 and has its other end extending through a radial slot 208 in the main cam 135.

The auxiliary cam

The auxiliary cam 141 is rotatably mounted upon the other end of the hub 204. This auxiliary cam 141 is provided with a spring latch 210 provided with a spring 212 normally keeping its pawl-shaped end in engagement with a friction drive plate or notched disc 214 which is fixed to the hub 204. This disc 214 is provided with an elongated notch located adjacent the flat side of the cam 141 as it is shown in Fig. 7. Next to this notched disc 214 is a serrated disc 216. This serrated disc 216 is held in frictional engagement with the notched disc 214 by a spring pressure plate 213 which like the disc 214, is fixed to the hub 204. The end of the spring latch 210 is so shaped that it will fit loosely into any one of the notches provided on the serrated disc 216 when the end of the spring latch 210 is in registration with the notch of the notched disc 214. When the spring latch 210 is so engaged, the cam 141 is connected through the spring latch 210 and the serrated disc 216 into frictional connection with the hub 204 and the notched disc 214.

The notch in the disc 214 is so arranged that when the knob 133 approaches one of the selective washing positions in setting the timing device, the notched portion of the notched disc 214 will reach a point where the end of the spring latch 210 is positioned when the auxiliary cam remains stopped by the engagement of the projecting end 220 of the spring latch 210 with the stop pin 147. This will allow the pawl end of the spring latch to drop into one of the notches of the serrated disc 216 and cause the auxiliary cam to be carried in a clockwise direction to its position against the stop pin 145 which will prevent further clockwise movement of the auxiliary cam 141.

When the auxiliary cam 141 is against the stop 145, the movable contact 96 is held in engagement with the stationary contact 98 by the cam surface of the auxiliary cam which is in engagement with the pointed cam follower 222. The notch in the notched disc 214 is sufficiently long to allow the movement of the knob 133 to any one of the selective washing positions while the auxiliary cam 141 is against the stop pin 145. As is plainly seen in Fig. 7 the auxiliary cam 141 is provided with a special shoulder for engagement with the stop pin 145. By this arrangement, regardless of the washing position to which the knob 133 is set in the normal clockwise direction, the auxiliary cam 141 will always be against the stop 145 when the knob reaches the washing position selected.

At this time, the engagement of the spring latch 210 with a notch in the serrated disc 216 insures the frictional connection between the auxiliary cam 141 and the hub 204 as well as the main shaft 167. Therefore any counterclockwise movement of the main shaft 167 and the auxiliary hub 204 will carry the auxiliary cam in a counterclockwise direction. The auxiliary cam 141 is provided with a high portion 224 upon which the cam follower 222 rests to hold the movable contact 96 in engagement with the stationary contact 98. This high portion 224 of the cam is sufficiently long to hold the movable contact in engagement with the stationary contact a sufficient length of time to energize and hold either the hot water solenoid 42 or the mixed water solenoid 46 in the open position for a period of time long enough to fill the tub 28 with hot or mixed water or washing fluid.

In the washing machine which I have taken as an example, this period is about 2½ minutes. At the end of this period the cam follower 222 reaches the end of the cam surface 224 and drops into a notch 226 which allows the movable contact 96 to move into engagement with the stationary contact 94. For the remainder of the counterclockwise rotation this cam follower 222 will remain in the notch 226, since when the notch 226 reaches the cam follower 222, the end 220 of the spring latch 210 will engage the pin 147 to lift the end of the spring latch 210 out of the notch in the serrated disc 216. A slight additional rotation of the main shaft 167 will move the notched portion of the notched disc 214 away from the end of the spring latch 210 so that the end of the spring latch 210 will again rest upon the high part of the notched disc 214. This will disconnect the auxiliary cam 141 from its friction drive connection through the serrated disc 216 with the hub 204 and the main shaft 167 for the remainder of the counterclockwise rotation of the knob 133. This disconnection of the spring latch drive frees the clock mechanism from the frictional load which would otherwise be imposed upon the clock mechanism by reason of the fact that the cam 141 is stopped by the pins 147 and the hub 204 would be forced to rotate against the frictional torque produced by the serrated disc 216 bearing against the friction drive plate or notched disc 214.

*The main cam*

At the time the auxiliary cam 141 is set as described, the main cam 135 is set to a position in which the upper and lower washing portions 230 and 232 are engaged respectively with the upper cam follower 234 and the lower cam follower 236. When the upper washing cam portion 230 is in engagement with the upper cam follower 234, it holds the movable contact 88 in engagement with the stationary contact 86. Likewise, when the lower washing cam portion 232 is in engagement with the cam follower 236, the pole changer switch 72 is held in its lowermost position. However, each of these switches are ineffective to produce operation of the motor 52 as long as the auxiliary cam holds the movable contact in engagement with the stationary contact 98.

However, at the end of the initial filling period, the notch 226 will reach the cam follower 222 to allow the movable contact 96 to engage the stationary contact 94. This will allow the electric energy to flow through the electrical circuits as was explained in Fig. 18 to cause the motor 52 to operate in the forward direction to agitate the washing fluid in the tub 28. The distance which the main cam 135 is turned in a clockwise direction will determine the length of the washing period since this factor will determine the length of the washing cam portions which will be moved in contact with their respective cam followers.

When the main cam 135 is turned so that the ends of the washing cam portions 230 and 232 reach their respective cam followers 234 and 236, it will be rotated suddenly by reason of the tongue in the slot connection 206 and 208 since the cam followers are then, by the spring pressure provided in the movable contact members, pressed into the notches 238 and 240. This moves both the upper and lower movable contact members to an intermediate point between their respective stationary contact members so that the motor 52 is deenergized for a short period of time providing first pause indicated in the timing diagram of Fig. 2.

However, shortly afterward, the lower cam follower 236 moves into engagement with a deeper portion of the notch 240 to place the pole changer switch 72 in a reversing position for reverse motor operation. At the same time the upper cam follower 234 moves into engagement with the second high portion 242 of the cam 135 so that the motor is again energized. This will cause operation of the motor 52 in the reverse direction to cause the tub 28 to be spun for the purpose of removing the water from the tub 28.

After the second high portion 242 completes this movement in engagement with the cam follower 234, the cam follower 234 drops into a deep notch 246 which first allows the movable contact 88 to move to an intermediate position to deenergize the motor 52 for a sufficient length of time to allow the tub 28 to stop. After this the cam follower 234 drops deeper into the deep notch 246 to allow the movable contact 88 to move into engagement with the stationary contact 90. This will keep the motor 52 deenergized and will allow the mix water valve 46 to be energized until the cam follower 234 is raised by the rear side of the deep notch 246.

The raising of the cam follower 234 will first deenergize the tempered water valve 46 and then raise the movable contact 88 into engagement with the stationary contact 86. At the same time the rear edge of the notch 240 will engage the cam follower 236 to move the pole changer switch 72 again into the forward position. This is caused by the high cam portion 248. This high cam portion 248 as well as the high cam portion 250 on the opposite side of the cam 135 will keep the motor 52 in operation for a short period of time for rinsing the clothes for the first time in the mixed water.

Following this upon each side of the cam there are provided similar projections and notches providing a pause, a spin, another pause and a long spin, after which the machine is stopped by the knob 133 coming into engagement with a stop pin 256 which engages a web 258 in the interior of the knob 133. Since the main spring is still attempting to rotate the shaft 167 with respect to the clock mechanism 169 the engagement of the knob 133 with the stop pin 256 will cause the main spring to react upon the clock mechanism to lift the contact 107 away from the contact 105 to deenergize the washing machine. Also, at the same time, the main cam provides a notch 260 which will engage the cam follower 234 to hold the movable contact 88 in an intermediate position thereby insuring deenergization of all the electrical parts of the washing machine.

It should be understood that the main cam 135 as well as the contacts operated thereby may be arranged to accomplish these same and other functions in different types of washing machines by a similar or different arrangement of cam surfaces and switch mechanism operated by the cam surfaces. Also, if a more complicated control is necessary, additional cams may be fixed to the hub 204 like the main cam 135 to accomplish additional functions and to accommodate other types of washing machines.

I have also provided a method by which the control may be used for automatic soaking of the clothes. For this purpose I provide a cam 262 upon the inside of the knob 133 as is shown in Figs. 3 and 4. When the handle 155 is moved to the position shown in Fig. 4, through a light spring 264 it urges a detent 266 into engagement with the inner edge of the cam 262. As soon as the knob turns in a counterclockwise direction when viewed from the front or in a clockwise direction when viewed from the rear as shown in Fig. 4, the shoulder 268 will engage the detent 266 to stop the rotation of the knob and through the action of the main spring upon the clock mechanism will stop the operation of the washing machine through the lifting of the contact 107 away from the contact 105. The shoulder 268 is so positioned that the machine is stopped immediately after the introduction of the first mixed water rinse. This cam, however, may be so located that the knob may be stopped at any desired point throughout the cycle. For example, it may be used to stop the operation immediately after the initial filling of hot or mixed water.

While the form of embodiment of the invention as herein disclosed, constitutes a preferred form, it is to be understood that other forms might be adopted, all coming within the scope of the claims which follow.

What is claimed is as follows:

1. A timing device comprising a rotatable member, timing driving means for said rotatable member, electrical means controlled by said rotatable member, manually operable means for setting said rotatable member, and means responsive to a forcible rotational movement of said manual operable means for deenergizing said electrical means during any manual setting of the manually operable means at any point in its range of movement.

2. A settable timing device for controlling an electric circuit comprising contact means, a timing means for controlling the contact means, a selective setting means for selectively setting the timing means for various selected periods of time, and means responsive to a forcible rotational movement of the setting means and operable coincidentally with the setting of the timing device for deenergizing the electric circuit during the entire setting of the device to any point in its entire range.

3. A timing device comprising a rotatable shaft, a spring clock mechanism having its spring motor wound by and in direct accordance with the movement of said rotatable shaft, a friction clutch connecting said clock mechanism and said rotatable shaft, electrical control means connected to and operated by said rotatable shaft, manipulating means for rotating said rotatable shaft through selective parts of a revolution to wind said spring motor in variable amounts, and a second electrical control means operated by any winding movement of said manipulating means for deenergizing the first electrical control means.

4. A timing device comprising a first rotatable member, a second rotatable member rotatable with respect to the first member, a friction slip clutch device having one of its clutch portions connected to one of said members, connecting means for connecting a second clutch portion to the other of said members, means operated upon a predetermined rotational movement of one of said members for releasing said connecting means, and a timing drive means for one of said rotatable members.

5. A timing device comprising a first operating member, a second operating member, a friction slip clutch connection connecting the first and second operating members, a timing drive means for moving said first operating member in one direction at a predetermined speed, a setting means for moving said first operating member in a second direction to various selected positions, and a stop means positioned for limiting the movement of said second operating member in said second direction before said first member reaches said selective positions.

6. A timing device comprising a first operating member, a second operating member, a friction slip clutch connection connecting the first and second operating members, a timing drive means for moving said first operating member in one direction at a predetermined speed, a setting means for moving said first operating member in a second direction to various selected positions, a stop means for limiting the movement of said second operating member in said second direction, and a second stop means for limiting the movement of said second operating member in said first direction.

7. A timing device comprising a first operating member, a second operating member, a friction slip clutch connection connecting the first and second operating members, a timing drive means for moving said first operating member in one direction at a predetermined speed, a setting means for moving said first operating member in a second direction to various selected positions, a stop means for limiting the movement of said first operating member in said second direction, and another stop means for stopping the movement of said second operating member in said second direction in advance of the stopping of the first operating member.

8. A timing device comprising a first operating member, a second operating member, a friction slip clutch connection connecting the first and second operating members, a timing drive means for moving said first operating member in one direction at a predetermined speed, a setting means for moving said first operating member to any one of a plurality of selective positions to provide a selected timed period during which the timing device moves the first member in the first direction at a predetermined speed, and a stop means positioned for engaging and stopping the movement of said second operating member in said second direction in advance of the first operating member reaching any of said selective positions to provide a definite relationship between the movement of the first operating means to the position selected and the position of the second operating member.

9. A timing device including a mechanism to be operated, a bodily movable timing driving means for operating said mechanism to be operated, setting means for setting said timing driving means, and a switch contact mechanism operated by the bodily movement of the timing driving means.

10. A timing device including a mechanism to be operated, a timing driving means having a movable frame and a drive shaft rotatable relative to the frame for operating said mechanism to be operated, and a switch contact mechanism operated by the movement of said movable frame.

11. A timing device including a mechanism to be operated, a spring type timing driving means having a drive shaft extending to the mechanism to be operated, means for winding the spring and setting the timing means, said spring type timing means being bodily movable about the axis of said drive shaft, and a switch contact mechanism for resisting the bodily movement and having a resistance to contact operation greater than the normal torque of the timing driving means applied to the drive shaft but less than the torque required to wind the spring of the timing means, said switch mechanism being operated by the bodily movement of the timing means.

12. A timing device comprising a first operating member having a starting position, a second operating member, a friction slip connection connecting said first and second members, means for setting said first member to a plurality of selective positions located in a first direction from the starting position, a timed driving means for driving said first member from any of said selective positions back to said starting position, and a stop means positioned to stop said second member when said first member is between said starting position and said selective positions.

13. A timing device comprising a first operating member having a starting position, a second operating member, a friction slip connection connecting said first and second members, means for setting said first member to a plurality of selective positions located in a first direction from the starting position, a timed driving means for driving said first member from any of said selective positions back to said starting position, a stop means positioned to stop said second member when said first member is between said starting position and said selective positions, and means for restoring the initial relationship between the first and second members before the first member is returned completely to its starting position.

14. A timing device comprising a first operating member having a starting position, a second operating member, a friction slip connection connecting said first and second members, means for setting said first member to a plurality of selective initial operating positions located in a first direction from the starting position, a timing drive means for driving said first member from any of said selective positions to said first position and for driving said second member from said first member through said friction connection, and a stop means positioned to stop said second member in its initial operating position prior to the first member reaching any of said selective positions in its setting operation.

15. A timing device comprising a first operating member, a second operating member, manually operable means for moving said first member a variable amount in one direction, said manually operable means including means dependent upon a predetermined initial movement of said first member in said one direction for setting said second member in its same initial position with respect to a predetermined stationary point whenever said first member is moved to any point beyond said predetermined initial movement.

KENDALL CLARK.